US012670598B2

(12) United States Patent
Trayanova et al.

(10) Patent No.: US 12,670,598 B2
(45) Date of Patent: Jun. 30, 2026

(54) ANATOMICALLY-INFORMED DEEP LEARNING ON CONTRAST-ENHANCED CARDIAC MRI FOR SCAR SEGMENTATION AND CLINICAL FEATURE EXTRACTION

(71) Applicant: THE JOHNS HOPKINS UNIVERSITY, Baltimore, MD (US)

(72) Inventors: Natalia A. Trayanova, Baltimore, MD (US); Haley Gilbert Abramson, Baltimore, MD (US); Dan Popescu, Baltimore, MD (US); Mauro Maggioni, Baltimore, MD (US); Katherine C. Wu, Bel Air, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 458 days.

(21) Appl. No.: 18/249,583

(22) PCT Filed: Oct. 19, 2021

(86) PCT No.: PCT/US2021/055532
§ 371 (c)(1),
(2) Date: Apr. 19, 2023

(87) PCT Pub. No.: WO2022/086910
PCT Pub. Date: Apr. 28, 2022

(65) Prior Publication Data
US 2023/0394670 A1 Dec. 7, 2023

Related U.S. Application Data

(60) Provisional application No. 63/094,138, filed on Oct. 20, 2020.

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/10088* (2013.01);
(Continued)

(58) Field of Classification Search
USPC ........................................................ 382/131
See application file for complete search history.

(56) References Cited

U.S. PATENT DOCUMENTS 9,311,570 B2 4/2016 Mohr et al.
9,968,257 B1 5/2018 Burt
(Continued)

OTHER PUBLICATIONS

Sajad Norouzi et al. "Exemplar based Generation and Data Augmentation using Exemplar VAEs", arXiv:2004.04795v2 [cs.LG], Jul. 3, 2020, pp. 1-19 (Year: 2020).*
(Continued)

*Primary Examiner* — Chineyere Wills-Burns
*Assistant Examiner* — Aaron Timothy Bonansinga
(74) *Attorney, Agent, or Firm* — MH2 Technology Law Group, LLP

(57) ABSTRACT

Fully automated computer-implemented deep learning techniques of contrast-enhanced cardiac MRI segmentation are provided. The techniques may include providing cardiac MRI data to a first computer-implemented deep learning network trained in order to identify a left ventricle region of interest to generate left ventricle region-of-interest-identified cardiac MRI data. The techniques may also include providing the left ventricle region-of-interest-identified cardiac MRI data to a second computer-implemented deep learning network trained in order to identify myocardium to generate myocardium-identified cardiac MRI data. The techniques may further include providing the myocardium-identified cardiac MRI data to at least one third computer-implemented deep learning network trained to conform data to geometrical anatomical constraints in order to generate
(Continued)

anatomical-conforming myocardium-identified cardiac MRI data. The techniques may further include outputting the anatomical-conforming myocardium-identified cardiac MRI data.

10 Claims, 9 Drawing Sheets

(52) U.S. Cl.
CPC .............. *G06T 2207/20081* (2013.01); *G06T 2207/20084* (2013.01); *G06T 2207/30048* (2013.01)

(56) References Cited

U.S. PATENT DOCUMENTS

| | | | |
|---|---|---|---|
| 2005/0238215 A1 | 10/2005 | Jolly et al. | |
| 2013/0004052 A1* | 1/2013 | Chen ...................... | G06T 7/251 |
| | | | 382/132 |
| 2015/0178938 A1* | 6/2015 | Gorman, III ............ | G06T 7/174 |
| | | | 382/131 |
| 2019/0015059 A1* | 1/2019 | Itu ........................... | G06T 7/143 |
| 2019/0057505 A1* | 2/2019 | Pheiffer ................ | G06T 7/0016 |
| 2019/0205766 A1* | 7/2019 | Krebs ........................ | G06T 7/33 |
| 2020/0065969 A1* | 2/2020 | Huang ...................... | G06T 7/11 |
| 2020/0069973 A1* | 3/2020 | Lou ........................... | G06N 5/04 |
| 2020/0118266 A1* | 4/2020 | Avendi .................... | G06T 7/162 |
| 2020/0193603 A1* | 6/2020 | Golden ..................... | G06T 7/10 |
| 2020/0222018 A1* | 7/2020 | van Walsum ........ | A61B 5/0044 |
| 2020/0237284 A1* | 7/2020 | Kopparapu ............ | G06N 3/047 |
| 2020/0394795 A1* | 12/2020 | Isgum ................... | G06T 7/0012 |
| 2021/0041953 A1* | 2/2021 | Poltorak ................ | H04W 4/80 |
| 2021/0142177 A1* | 5/2021 | Mallya ................... | G06N 3/084 |
| 2021/0312674 A1* | 10/2021 | Abrol ........................ | G06T 7/11 |
| 2021/0358577 A1* | 11/2021 | Zhang ................. | G06N 3/0499 |
| 2021/0397886 A1* | 12/2021 | Chen .................... | G06N 3/0475 |
| 2021/0397971 A1* | 12/2021 | Pardeshi ................ | G06N 3/045 |
| 2022/0310196 A1* | 9/2022 | Polykovskiy .......... | G16B 20/00 |

OTHER PUBLICATIONS

Evstigneev, V. (Authorized officer), International Search Report and Written Opinion in corresponding International Application No. PCT/US2021/055532 mailed on Jan. 27, 2022, 7 pages.

Wittmann-Regis, A. (Authorized officer), International Preliminary Report on Patentability in corresponding International Application No. PCT/US2021/055532 mailed on May 4, 2023, 6 pages.

Abadi, Martin et al. "TensorFlow: Large-scale machine learning on heterogeneous systems, software available from tensorflow. org (2015)." URL https://www. tensorflow. org (2015).

Akaike, Hirotugu. "A new look at the statistical model identification." IEEE transactions on automatic control 19.6 (1974): 716-723.

Ballistipedia. Bivariate. Retrieved from http://ballistipedia.com/index.php?title=File:Bivariate.png).

Bello, Ghalib A. et al. "Deep-learning cardiac motion analysis for human survival prediction." Nature machine intelligence 1.2 (2019): 95-104.

Bernard, Olivier et al. "Deep learning techniques for automatic MRI cardiac multi-structures segmentation and diagnosis: is the problem solved ?." IEEE transactions on medical imaging 37.11 (2018): 2514-2525.

Cain, Matthew A. et al. "Cardiac sarcoidosis detected by late gadolinium enhancement and prevalence of atrial arrhythmias." The American journal of cardiology 113.9 (2014): 1556-1560.

Campello, Víctor M. et al. "Combining multi-sequence and synthetic images for improved segmentation of late gadolinium enhancement cardiac MRI." Statistical Atlases and Computational Models of the Heart. Multi-Sequence CMR Segmentation, CRT-EPiggy and LV Full Quantification Challenges: 10th International Workshop, STACOM 2019, Held in Conjunction with MICCAI 2019, Shenzhen, China, Oct. 13, 2019, Revised Selected Papers 10. Springer International Publishing, 2020.

Chen, Chen et al. "Deep learning for cardiac image segmentation: a review." Frontiers in Cardiovascular Medicine 7 (2020): 25.

Chen, Chen et al. "Unsupervised multi-modal style transfer for cardiac MR segmentation." Statistical Atlases and Computational Models of the Heart. Multi-Sequence CMR Segmentation, CRT-EPiggy and LV Full Quantification Challenges: 10th International Workshop, STACOM 2019, Held in Conjunction with MICCAI 2019, Shenzhen, China, Oct. 13, 2019, Revised Selected Papers 10. Springer International Publishing, 2020.

Cheng, Alan et al. "Prospective observational study of implantable cardioverter-defibrillators in primary prevention of sudden cardiac death: study design and cohort description." Journal of the American Heart Association 2.1 (2013): e000083.

Disertori, Marcello, et al. "Myocardial fibrosis assessment by LGE is a powerful predictor of ventricular tachyarrhythmias in ischemic and nonischemic LV dysfunction: a meta-analysis." JACC: Cardiovascular Imaging 9.9 (2016): 1046-1055.

Dong, Suyu et al. "A combined fully convolutional networks and deformable model for automatic left ventricle segmentation based on 3D echocardiography." BioMed research international 2018 (2018).

Fahmy, Ahmed S. et al. "Improved quantification of myocardium scar in late gadolinium enhancement images: deep learning based image fusion approach." Journal of Magnetic Resonance Imaging 54.1 (2021): 303-312.

Huang, Su et al. "An image-based comprehensive approach for automatic segmentation of left ventricle from cardiac short axis cine mr images." Journal of digital imaging 24 (2011): 598-608.

Khened, Mahendra et al. "Fully convolutional multi-scale residual DenseNets for cardiac segmentation and automated cardiac diagnosis using ensemble of classifiers." Medical image analysis 51 (2019): 21-45.

Kim, R. J. et al. Relationship of MRI delayed contrast enhancement to irreversible injury, infarct age, and contractile function. Circulation 100 (1999): 1992-2002.

Kingma, Diederik P. et al. "Adam: A method for stochastic optimization." arXiv preprint arXiv:1412.6980 (2014).

Klem, Igor et al. "Assessment of myocardial scarring improves risk stratification in patients evaluated for cardiac defibrillator implantation." Journal of the American College of Cardiology 60.5 (2012): 408-420.

Kurzendorfer T. et al. "Fully automatic segmentation of left ventricular anatomy in 3-D LGE-MRI." Computerized Medical Imaging and Graphics 59 (2017): 13-27.

Kwon, Deborah H. et al. "Extent of left ventricular scar predicts outcomes in ischemic cardiomyopathy patients with significantly reduced systolic function: a delayed hyperenhancement cardiac magnetic resonance study." JACC: Cardiovascular Imaging 2.1 (2009): 34-44.

Larrazabal, Agostina J. et al. "Post-DAE: anatomically plausible segmentation via post-processing with denoising autoencoders." IEEE Transactions on Medical Imaging 39.12 (2020): 3813-3820.

Marra, Martina Perazzolo et al. "Impact of the presence and amount of myocardial fibrosis by cardiac magnetic resonance on arrhythmic outcome and sudden cardiac death in nonischemic dilated cardiomyopathy." Heart Rhythm 11.5 (2014): 856-863.

Mesubi, Olurotimi et al. "Differences in quantitative assessment of myocardial scar and gray zone by LGE-CMR imaging using established gray zone protocols." The international journal of cardiovascular imaging 31.2 (2015): 359-368.

Moccia, Sara et al. "Development and testing of a deep learning-based strategy for scar segmentation on CMR-LGE images." Magnetic Resonance Materials in Physics, Biology and Medicine 32 (2019): 187-195.

Mordi, Ify et al. "LGE and NT-proBNP identify low risk of death or arrhythmic events in patients with primary prevention ICDs." JACC: Cardiovascular Imaging 7.6 (2014): 561-569.

Painchaud, Nathan et al. "Cardiac MRI Segmentation with Strong Anatomical Guarantees." Medical Image Computing and Computer

(56)  References Cited

OTHER PUBLICATIONS

Assisted Intervention—MICCAI 2019. MICCAI 2019. Lecture Notes in Computer Science, vol. 11765. Springer, Cham.

Pizer, Stephen M. et al. "Adaptive histogram equalization and its variations." Computer vision, graphics, and image processing 39.3 (1987): 355-368.

Radau, Perry et al. "Evaluation framework for algorithms segmenting short axis cardiac MRI." The MIDAS Journal (2009).

Roes, Stijntje D. et al. "Infarct tissue heterogeneity assessed with contrast-enhanced MRI predicts spontaneous ventricular arrhythmia in patients with ischemic cardiomyopathy and implantable cardioverter-defibrillator." Circulation: Cardiovascular Imaging 2.3 (2009): 183-190.

Ronneberger, Olaf et al. "U-net: Convolutional networks for biomedical image segmentation." Medical Image Computing and Computer-Assisted Intervention—MICCAI 2015: 18th International Conference, Munich, Germany, Oct. 5-9, 2015, Proceedings, Part III 18. Springer International Publishing, 2015.

Roth, Holger et al. "Cardiac segmentation of LGE MRI with noisy labels." Statistical Atlases and Computational Models of the Heart. Multi-Sequence CMR Segmentation, CRT-EPiggy and LV Full Quantification Challenges: 10th International Workshop, STACOM 2019, Held in Conjunction with MICCAI 2019, Shenzhen, China, Oct. 13, 2019, Revised Selected Papers 10. Springer International Publishing, 2020.

Scott, Paul A. et al. "The extent of left ventricular scar quantified by late gadolinium enhancement MRI is associated with spontaneous ventricular arrhythmias in patients with coronary artery disease and implantable cardioverter-defibrillators." Circulation: Arrhythmia and Electrophysiology 4.3 (2011): 324-330.

Suh, Doug Young et al. "Knowledge-based system for boundary detection of four-dimensional cardiac magnetic resonance image sequences." IEEE transactions on medical imaging 12.1 (1993): 65-72.

Suri, Jasjit S. "Computer vision, pattern recognition and image processing in left ventricle segmentation: The last 50 years." Pattern Analysis & Applications 3.3 (2000): 209-242.

Van Der Burg, Alida E. Borger et al. "Impact of viability, ischemia, scar tissue, and revascularization on outcome after aborted sudden death." Circulation 108.16 (2003): 1954-1959.

Xiong, Zhaohan et al. "A global benchmark of algorithms for segmenting the left atrium from late gadolinium-enhanced cardiac magnetic resonance imaging." Medical image analysis 67 (2021): 101832.

Yue, Qian et al. "Cardiac segmentation from LGE MRI using deep neural network incorporating shape and spatial priors." Medical Image Computing and Computer Assisted Intervention—MICCAI 2019: 22nd International Conference, Shenzhen, China, Oct. 13-17, 2019, Proceedings, Part II 22. Springer International Publishing, 2019.

Zabihollahy, Fatemeh et al. "Fully automated segmentation of left ventricular scar from 3D late gadolinium enhancement magnetic resonance imaging using a cascaded multi-planar U-net (CMPU-net)." Medical physics 47.4 (2020): 1645-1655.

Zheng, Qiao et al. "3-D consistent and robust segmentation of cardiac images by deep learning with spatial propagation." IEEE transactions on medical imaging 37.9 (2018): 2137-2148.

Zhuang, Xiahai et al. "Cardiac segmentation on late gadolinium enhancement MRI: a benchmark study from multi-sequence cardiac MR segmentation challenge." Medical Image Analysis 81 (2022): 102528.

Zhuang, Xiahai. "Multivariate mixture model for cardiac segmentation from multi-sequence MRI." Medical Image Computing and Computer-Assisted Intervention—MICCAI 2016: 19th International Conference, Athens, Greece, Oct. 17-21, 2016, Proceedings, Part II 19. Springer International Publishing, 2016.

Zhuang, Xiahai. "Multivariate mixture model for myocardial segmentation combining multi-source images." IEEE transactions on pattern analysis and machine intelligence 41.12 (2018): 2933-294.

Zhu, Jun-Yan et al. "Unpaired image-to-image translation using cycle-consistent adversarial networks." Proceedings of the IEEE international conference on computer vision. 2017.

Zipes, Douglas P. et al. "Sudden cardiac death." Circulation 98.21 (1998): 2334-2351.

Abramson, Haley G., et al. "Anatomically-informed deep learning on contrast-enhanced cardiac MRI for scar segmentation and clinical feature extraction." Unpublished draft.

* cited by examiner

ANATOMICALLY-INFORMED DEEP LEARNING ON CONTRAST-ENHANCED CARDIAC MRI FOR SCAR SEGMENTATION AND CLINICAL FEATURE EXTRACTION

CROSS-REFERENCE TO RELATED APPLICATIONS

This application is the national stage entry of International Patent Application No. PCT/US2021/055532, filed on Oct. 19, 2021, and published as WO 2022/086910 A1 on Apr. 28, 2022, which claims the benefit of U.S. Provisional Patent Application Ser. No. 63/094,138, filed on Oct. 20, 2020, both of which are hereby incorporated by reference herein in their entireties.

GOVERNMENT FUNDING

This invention was made with government support under grant HL142496 awarded by the National Institutes of Health. The government has certain rights in the invention.

FIELD

This disclosure relates generally to cardiac image processing.

BACKGROUND

Many cardiac diseases are associated with structural remodeling of the myocardium. In both ischemic and non-ischemic cardiomyopathies, the presence of myocardial fibrosis and scar significantly elevates the risk for lethal heart rhythm disorders and sudden cardiac death (SCD). Therefore, assessment of myocardial scar and fibrosis is important for diagnostic and prognostic purposes, in forecasting the trajectory of heart disease, evaluating arrhythmia propensity in the heart, and stratifying patients for SCD risk. Cardiac magnetic resonance (CMR) imaging with late gadolinium enhancement (LGE) has unparalleled capability in the detection and quantification of scar and fibrosis, visualized as increased brightness in regions with a higher proportion of extracellular space. The utility of scar/fibrosis assessment in clinical decision-making has been demonstrated by a large body of clinical research in patients with different cardiomyopathies, and by a number of mechanistic studies of arrhythmogenesis in heart disease. However, LGE-CMR image analysis is a laborious task prone to substantial inter-observer variability. It requires expert contouring of the epicardial and endocardial borders, the intermediate-intensity peri-infarct zone (gray zone), and the high-intensity dense scar region.

Segmentation algorithms for the left ventricle (LV) myocardium have predominantly focused on cine CMR images. Despite promising advances, most cine segmentation algorithms still require manual steps. For example, the method of Zheng, Q., Delingette, H., Duchateau, N. & Ayache, N., *3-D consistent and robust segmentation of cardiac images by deep learning with spatial propagation*, IEEE Trans Med Imaging (2018), requires a preprocessing step to discard apical and basal slices and a manual curation of "difficult cases". Bello, G. A. et al. *Deep-learning cardiac motion analysis for human survival prediction*, Nat. Mach. Intell. 1, 95-104, doi.org/10.1038/s42256-019-0019-2 (2019), attempts to segment cine images, but relies on ground truth landmark annotations to prevent anatomically inconsistent outliers. The current limitations in cine segmentation have demonstrated that LGE-CMR is likely not amenable to a re-implementation of methods developed for cine scans.

Deep-learning-based image segmentation offers the promise of full automation and output consistency. However, most of the available algorithms require intensive manual interventions, e.g., specifying anatomical landmarks or labeling boundary slices of the stack at the apex and base of the heart. The few deep learning algorithms developed for LGE-CMR myocardial segmentation, and the even fewer for LGE-CMR scar/fibrosis segmentation, all suffer from several limitations. Specifically, these approaches fail to address the presence of resulting poor performing segmentation outliers and are not robust to varying image acquisition quality (i.e., different scanners and protocols at different centers) or to the varying fibrosis patterns resulting from different heart pathologies, potentially leading to bespoke algorithms, which fail to generalize across populations or produce anatomically plausible heart geometries.

Some deep learning methods have been proposed specifically for LGE-CMR myocardial or scar segmentation; however, these solutions also have a number of limitations. The work of Campello for segmenting the myocardium in LGE-CMR images, disclosed in Campello, V. et al., *Combining multi-sequence and synthetic images for improved segmentation of late gadolinium enhancement cardiac MRI*, Pop M. et al. (eds) Stat. Atlases Comput. Model. Hear. Multi-Sequence CMR Segmentation, CRT-EPiggy LV Full Quantification Challenges, STACOM 2019, Lect. Notes Comput. Sci., vol 12009, doi.org/10.1007/978-3-030-39074-7_31 (2020), attempted to address LGE-CMR data scarcity by using a costly deep learning cine-to-LGE style transfer approach. However, in the process, the style-transferred cine images lost the salient aspect of LGE-CMR, the scar/fibrosis features. A recent attempt by Zabihollahy at myocardial and scar/fibrosis segmentation on 3-D LGE-CMR, presented in Zabihollahy, F., Rajchl, 365 M., White, J. A. & Ukwatta, E., *Fully automated segmentation of left ventricular scar from 3-D late gadolinium enhancement magnetic resonance imaging using a cascaded multi-planar u-net (cmpu-net)*, Med. Phys. 47, 367 1645-1655, 10.1002/mp.14022 (2020), resulted in artifacts, such as disjoint pieces of the myocardium, despite the benefit of a ten-fold increase in the number of slices per patient furnished by the 3-D acquisition. The 2019 CMRSeg MICCAI challenge for myocardial segmentation (Yue, Q., Luo, X., Ye, Q., Xu, L. & Zhuang, X., *Cardiac segmentation from LGE MRI using deep neural network incorporating shape and spatial priors*, In Medical Image Computing and Computer Assisted Intervention—MICCAI 2019, vol. 11765, LNCS, 559-567, doi.org/10.1007/978-3-030-32245-8_62 (Springer, 2019); Roth, H., Zhu, W., Yang, D., Xu, Z. & Xu, D., *Cardiac segmentation of LGE MRI with noisy labels*, In Pop, M. et al. (eds.), Statistical Atlases and Computational Models of the Heart, Multi-Sequence CMR Segmentation, CRT-EPiggy and LV Full Quantification Challenges, 228-236 (Springer International Publishing, Cham, 2020); Chen, C. et al., *Unsupervised multi-modal style transfer for cardiac MR segmentation*, arXiv (2019); and Zhuang, X. et al., *Cardiac segmentation on late gadolinium enhancement MRI: A benchmark study from multi-sequence cardiac MR segmentation challenge*, arXiv (2020)) and a study focused on scar segmentation (Fahmy, A. S. et al., *Improved quantification of myocardium scar in late gadolinium enhancement images: Deep learning based image fusion approach*, J. Magn. Reson. Imaging Epub: Ahead of print., 10.1002/jmri.27555 (2021)) both required LGE-CMR and corresponding cine scans for each patient. Furthermore, Fahmy et al. exclusively utilized images of patients with hypertrophic cardiomyopathy and did not present overall myocardial segmentation performance, which could have been traded-off for better scar segmentation. An attempt by Moccia at predicting enhancement segmentations, presented in Moccia, S. et al., *Development and testing of a deep learning-based strategy for scar segmentation on CMR-LGE images*, Magn. Reson. Mater. Physics, Biol. Medicine 32, 187-195 (2019), required manually segmented ground truth myocardium as an additional network input; this requirement limited their dataset to only thirty patients, all from a single center.

A few recent methods have proposed post-processing steps to improve the anatomical accuracy of myocardial segmentations from cine images, e.g., as disclosed in Painchaud, N. et al., *Cardiac MRI segmentation with strong anatomical guarantees*, Shen D. et al. (eds) Med. Image Comput. Comput. Assist. Interv.—MICCAI 2019, Lect. Notes Comput. Sci. vol 11765, doi.org/10.1007/978-3-030-32245-8_70 (2019) and Larrazabal, A. J., Martinez, C., Glocker, B. & Ferrante, E., *Post-DAE: Anatomically plausible segmentation via post processing with denoising autoencoders*, IEEE Transactions on Med. Imaging 39, 3813-3820 (2020). Although these algorithms smooth out resulting segmentations, they have a number of limitations: they use of generic techniques unable to capture nuances of heart anatomy (Larrazabal et al.); they require an already highly accurate segmentation as input to function well (Painchaud et al.); or they do not incorporate 3-D constraints (Painchaud et al.).

SUMMARY

According to various embodiments, a fully automated computer-implemented deep learning method of contrast-enhanced cardiac MRI segmentation is presented. The method includes providing cardiac MRI data to a first computer-implemented deep learning network trained to identify a left ventricle region of interest, whereby left ventricle region-of-interest-identified cardiac MRI data is produced; providing the left ventricle region-of-interest-identified cardiac MRI data to a second computer-implemented deep learning network trained to identify myocardium, whereby myocardium-identified cardiac MRI data is produced; providing the myocardium-identified cardiac MRI data to at least one third computer-implemented deep learning network trained to conform data to geometrical anatomical constraints, whereby anatomical-conforming myocardium-identified cardiac MRI data is produced; and outputting the anatomical-conforming myocardium-identified cardiac MRI data.

Various optional features of the above embodiments include the following. The anatomical-conforming myocardium-identified cardiac MRI data may include scar segmentation data. The method may further include reducing a background based on the ventricle region-of-interest-identified cardiac MRI data. The second computer-implemented deep learning network may be trained to identify myocardium by delineating endocardium and epicardium. The at least one third computer-implemented deep learning network may trained to conform data to geometrical anatomical constraints by: autoencoding the myocardium-identified cardiac MRI data to generate a latent vector space; and statistically modeling the latent vector space; where the latent vector space allows for nearest-neighbor identification of the anatomical-conforming myocardium-identified cardiac MRI data. The first computer-implemented deep learning network may include a convolutional neural network with residuals. The second computer-implemented deep learning network may include a convolutional neural network with residuals. The at least one third computer-implemented deep learning network may include a convolutional autoencoder coupled to a Gaussian mixture model. No manual human intervention may be required. The outputting may include displaying on a computer monitor.

According to various embodiments, a fully automated computer system for deep learning contrast-enhanced cardiac MRI segmentation is presented. The computer system includes a first computer-implemented deep learning network trained to identify a left ventricle region of interest in cardiac MRI data to produce left ventricle region-of-interest-identified cardiac MRI data; a second computer-implemented deep learning network trained to identify myocardium in the left ventricle region-of-interest-identified cardiac MRI data to produce myocardium-identified cardiac MRI data; at least one third computer-implemented deep learning network trained to conform the myocardium-identified cardiac MRI data to geometrical anatomical constraints to produce anatomical-conforming myocardium-identified cardiac MRI data; and an output configured to provide the anatomical-conforming myocardium-identified cardiac MRI data.

Various optional features of the above embodiments include the following. The anatomical-conforming myocardium-identified cardiac MRI data may include scar segmentation data. The computer system may be configured to reduce a background based on the ventricle region-of-interest-identified cardiac MRI data. The second computer-implemented deep learning network may be trained to identify myocardium in the cardiac MRI data by delineating endocardium and epicardium. The at least one third computer-implemented deep learning network may be trained to conform the myocardium-identified cardiac MRI data to geometrical anatomical constraints by: autoencoding the myocardium-identified cardiac MRI data to generate a latent vector space; and statistically modeling the latent vector space; such that the latent vector space allows for nearest-neighbor identification of the anatomical-conforming myocardium-identified cardiac MRI data. The first computer-implemented deep learning network may include a convolutional neural network with residuals. The second computer-implemented deep learning network may include a convolutional neural network with residuals. The at least one third computer-implemented deep learning network may include a convolutional autoencoder coupled to a Gaussian mixture model. To manual human intervention may be required. The output may include a computer monitor configured to display the anatomical-conforming myocardium-identified cardiac MRI data.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
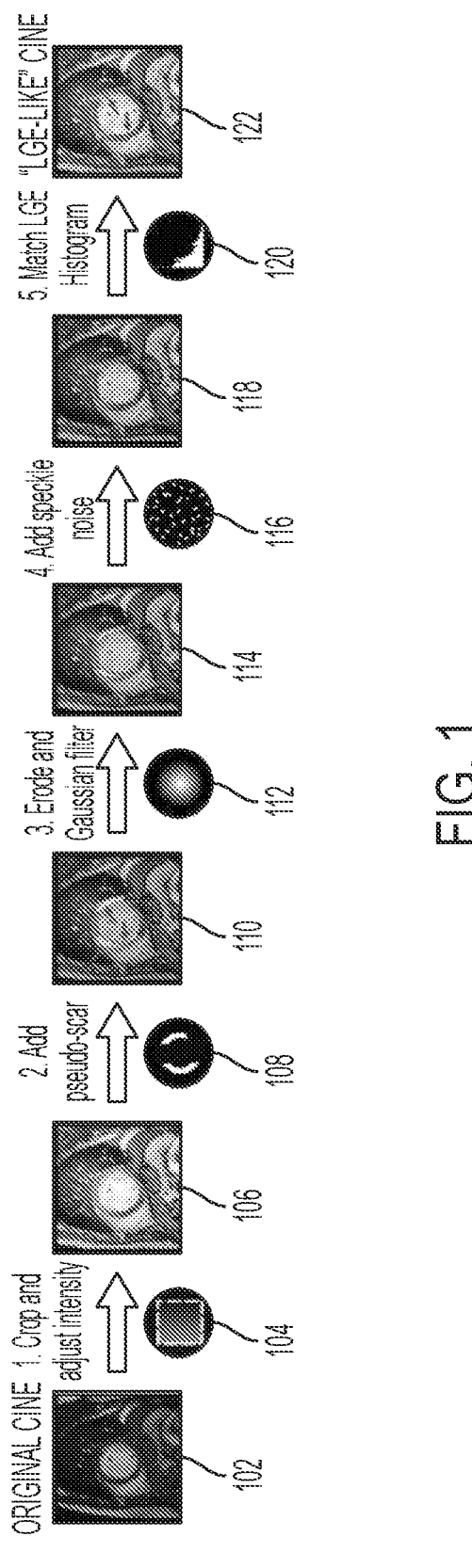
FIG. 1 is a schematic diagram of a method for converting cine images to LGE-like images according to various embodiments.

Embodiments as described herein are described in sufficient detail to enable those skilled in the art to practice the invention and it is to be understood that other embodiments may be utilized and that changes may be made without departing from the scope of the invention. The present description is, therefore, merely exemplary.

There is an unmet need for an automated method to segment myocardium and scar in LGE-CMR images. Ideally, resulting segmentations should be anatomically accurate, i.e., free from non-anatomical artefacts, thus ensuring seamless extraction of important clinical features used in diagnostic and prognostic decisions.

Some embodiments provide an anatomically-informed deep learning approach to LGE-CMR image segmentation and clinical feature extraction. This fully automated technology applies three stages of deep neural networks to, e.g., segment the LV, contour the LV myocardium, blood pool, and scar/fibrosis regions, and apply geometric constraints to the segmentations to ensure anatomical accuracy. Various embodiments may be robust to different scar/fibrosis distributions, to inputs from various imaging centers acquired on scanners from different manufacturers, and to multiple CMR modalities. An example reduction to practice outperformed inter-expert segmentation results and demonstrated consistently accurate performance across often ambiguous regions of the LV (e.g., apex and base). Segmentations produced by various embodiments may satisfy anatomical guidelines, allowing for expert-level immediate computation of clinical features, such as scar burden and LV volume. In sum, various embodiments may automatically, without any manual human intervention such as image annotation, provide anatomical-conforming myocardium-identified cardiac MRI data. Such data reveals properties such as volumes (e.g., left ventricle volume, scar volume) and overall cardiac geometry. These and other features and advantages are presented in detail herein. In the following, embodiments are described both in general and in reference to the example reduction to practice.

I. Imaging Data and Processing

The primary data source for the example reduction to practice was 2-D LGE-CMR scans acquired during the Left Ventricular Structural Predictors of Sudden Cardiac Death Study (ClinicalTrials.gov ID NCT01076660) sponsored by Johns Hopkins University. All LGE-CMR images used in this study were acquired using 1.5-T MRI devices (Signa, GE Medical Systems, Waukesha, Wisconsin; Avanto, Siemens, Erlangen, Germany). The contrast agent used was 0.15-0.20 mmol/kg gadodiamide (Omniscan, GE Healthcare) and the scan was captured 10-30 minutes after injection. The most commonly used sequence was inversion recovery fast gradient echo pulse, with an inversion recovery time typically starting at 250 ms and adjusted iteratively to achieve maximum nulling of normal myocardium. Typical spatial resolutions ranged 1.5-2.4 mm×1.5-2.4 mm×6-8 mm, with 2-4 mm gaps. After excluding scans with very poor quality, 1,124 2-D LGE-CMR slices were selected from 155 patients with ischemic cardiomyopathy (ICM). Trained experts provided manual segmentations of myocardium and scar/fibrosis.

LGE data was supplemented with LGE-like images based on 1,360 2-D short-axis end diastole cine CMR slices (245 scans) from two publicly available sources: the MICCAI Automated Cardiac Diagnosis Challenge and the Cardiac MR Left Ventricular Segmentation Challenge. Ground truth myocardium segmentations were provided with the scans. The cine CMR data set was converted into LGE-like images using a custom style transfer method, which is shown and described presently in reference to FIG. 1.

FIG. 1 is a schematic diagram 100 of a method for converting cine images to LGE-like images according to various embodiments. Method 100 may be used to generate or augment a training corpus used to train an embodiment, such as is shown and described herein in reference to FIG. 2. For example, an embodiments of method 100 was used to supplement a training corpus for the example reduction to practice described throughout herein. Method 100 may be implemented using hardware as shown and described herein in reference to FIG. 9.

At 104, an original cine image 102 may be cropped and/or padded to a square of size 192×192 pixels (no aspect ratio distortion), without centering. Further, to increase the contrast between myocardium and blood pool, contrast-limited adaptive histogram equalization (CLAHE) may be applied, resulting in square contrast-limited image 106.

At 108, the square contrast-limited image 106 may be further transformed by generating a pseudoenhancement (LGE-like enhanced myocardium) mask. The pseudo-enhancement may be is generated by intersecting the myocardium mask with a randomized collection of basic shapes (e.g., ellipses, squares, etc.) with randomized locations, resulting in pseudo-enhanced image 110.

At 112, the pseudo-scar mask of the pseudo-enhanced image 110 may be randomly eroded and Gaussian filters are applied to realistically blur and smooth the edges. The resulting mask may be overlaid onto the original (dark) myocardium, elevating the signal intensity in the corresponding area, and resulting in eroded image 114.

At 116, speckle noise may be added to the eroded image 114 to resemble LGE noise, resulting in speckled image 118.

At 120, one or more LGE-CMR scans may be sampled at random and a histogram-match is performed on the speckled image 118. That is, a histogram match may be performed between the speckled image 118 and randomly sampled scans from the LGE training data set, resulting in LGE-like image 122. The resulting image may be finally re-scaled in the range [0, 255].

For the example reduction to practice, all LGE and resulting LGE-like 2-D slices were preprocessed and stored in a common file format to accommodate multiple medical image file types (e.g., DICOM, NIfTI, etc.), retaining 3-D ventricular geometry information. Specifically, slices were automatically ordered from apex to base, retaining slice location, image intensities, resolution, and patient orientation information. Slices without ground truth myocardial segmentation were excluded from training. The images were standardized in terms of orientation by applying rotations in increments of 90° (90° was chosen to avoid interpolation). If scans originally stored in DICOM had the "WindowCenter", "WindowLength", "RescaleSlope", and "RescaleIntercept" tags populated, the corresponding linear transformation was applied to the raw signal intensities to enhance contrast and brightness.

II. Multi-Network Architecture

Figure 2:
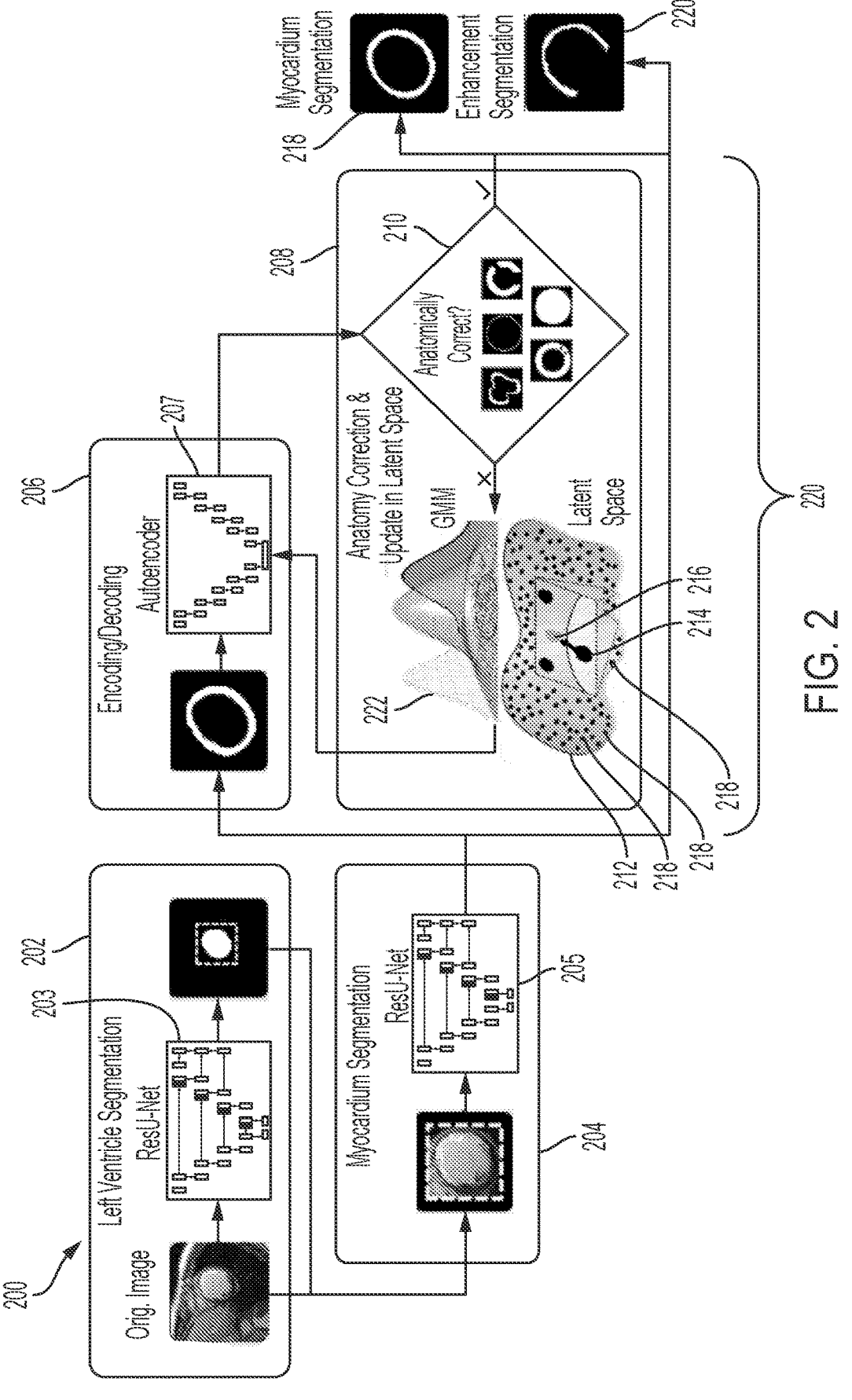
FIG. 2 is a schematic diagram of a fully-automated system for deep learning contrast-enhanced cardiac MRI segmentation according to various embodiments.

FIG. 2 is a schematic diagram of a fully-automated system 200 for deep learning contrast-enhanced cardiac MRI segmentation according to various embodiments. An embodiment of system 200 was used in the example reduction to practice described throughout herein. Briefly, system 200 may include three stages 202, 204, 220 to segment viable myocardium, enhanced myocardium (scar/fibrosis), and blood pool. The first stage 202 may include region of interest (ROI) segmentation neural network 203, which identifies the LV ROI, which may then be used to zero out signal outside a tight square around the segmented ROI. Thus, the first stage outputs LV ROI-identified cardiac MRI data. The second stage 204 may include myocardium segmentation neural network 205, which differentiates between myocardium and enhancement. Thus, the second stage outputs myocardium-identified cardiac MRI data. The third stage 220 may be a post-processing stage and may include encoding/decoding block 206, e.g., performed by autoencoder neural network 207, and anatomy correction and update 208 in latent space 212. The third stage 220 may adjust the predictions to satisfy anatomical constraints. Thus, the third stage outputs anatomical-conforming myocardium-identified cardiac MRI data. System 200 and the three stages 202, 204, 220 are described in detail presently in reference to FIG. 2 (overview), FIG. 3 (detailing the neural networks of the first stage 202 and second stage 204), FIG. 4 (detailing the neural network of the third stage 220), and FIG. 5 (detailing the anatomy correction and update 208 in latent space 212).

A. Stage 1: Region of Interest Segmentation Neural Network

ROI segmentation neural network 203 may be used to identify and crop around the LV. Thus, ROI segmentation neural network 203 in the first stage 202 may be trained to predict a mask of the LV ROI, which includes myocardium and blood pool. A goal of ROI segmentation neural network 203 may be to simplify the detailed segmentation problem in the next stage by reducing the very high ratio of background-to-myocardium pixels and limiting the field of view for the second network to mostly myocardium features. ROI segmentation neural network 203 may be implemented as a U-Net with residuals (ResU-Net) of depth four, as shown and described presently in reference to FIG. 3.

Figure 3:
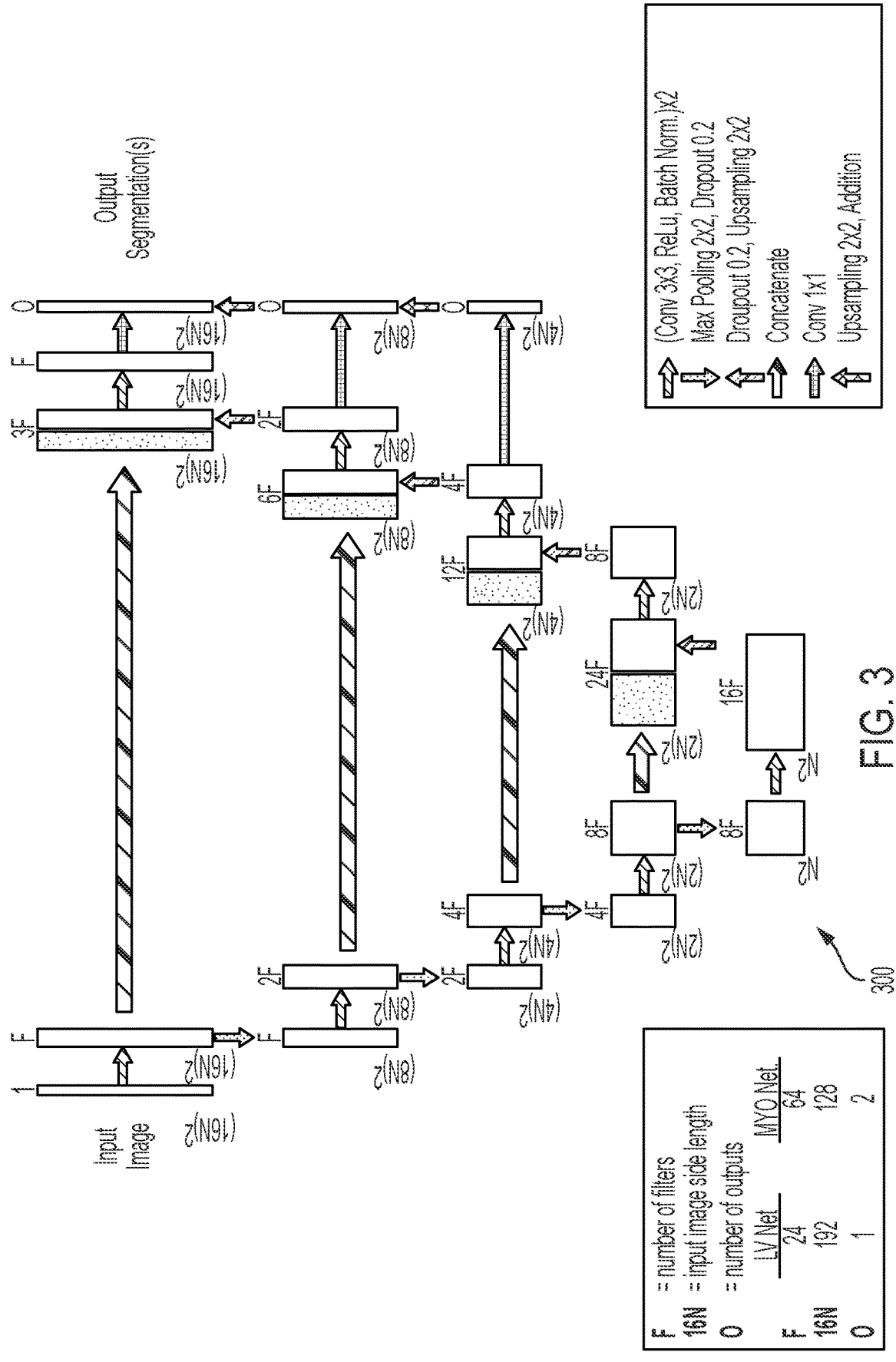
FIG. 3 is a schematic diagram of a left ventricle and myocardium segmentation neural network according to various embodiments.

FIG. 3 is a schematic diagram of an architecture of a left ventricle and myocardium segmentation neural network 300 according to various embodiments. Neural network 300 is suitable for implementing one or both of ROI segmentation neural network 203 and/or myocardium segmentation neural network 205. In general, ROI segmentation neural network 203 may identify the main region of interest, and myocardium segmentation neural network 205 may segment the myocardium by differentiating between viable and non-viable tissue represented by each of the two outputs. ROI segmentation neural network 203 and myocardium segmentation neural network 205 may differ by the number of filters, input image size, and number of outputs as indicated. Neural network 300 may be embodied on computer hardware such as is shown and described herein in reference to FIG. 9.

During the downsampling process, each of the four depth levels may consist of two repetitions of a block made up of a 3×3 2-D convolution, followed by a rectified linear unit (ReLU) activation and batch normalization. After the two blocks, each may be followed by a 2×2 max pooling layer and 20% dropout. The upsampling branch may have a similar structure using 2×2 nearest neighbor upsampling and identical convolutional layers. ROI predictions may be automatically cleaned up by discarding all but one connected component, specifically the one closest to the center of mass of objects in slices located between the $20^{th}$ and $80^{th}$ percentiles (higher confidence) of the short-axis height. Lastly, slices close to the base with very large jumps in ROI area may be deemed likely above the ventricle and automatically pruned.

B. Myocardium Segmentation Neural Network

Returning to FIG. 2, the myocardium segmentation neural network 205 of the second stage 204 may use the LV ROI-identified cardiac MRI data and/or the tightly cropped image from ROI segmentation neural network 203 to further segment the LV into viable and enhanced myocardium. Thus, the myocardium segmentation neural network 205 may use the ROI mask predicted by ROI segmentation neural network 203 to differentiate LV blood pool, viable myocardium, and regions of enhancement, returning segmentations for the latter two tissue types. As preprocessing, the ROI mask center of mass may be used to center the LV images in a 128×128 pixel square. Next, the predicted LV ROI may be used to re-scale the intensity values as follows.

Within the identified ROI, intensities may be re-scaled based on the intensity histogram derived from each patient's entire 2-D stack, thus preserving the intensity contrast of enhanced and non-enhanced myocardium. The median intensity (likely blood pool) may be set at the midpoint of the dynamic range interval. Specifically, the following functions may be applied sequentially to each 2-D input image component-wise:

$$I \mapsto \frac{I}{2m_{I_{\mathcal{D}}}} \tag{1}$$

$$I \mapsto 255 \times \frac{I - \min_{\mathcal{D}} I}{\max_{\mathcal{D}} I - \min_{\mathcal{D}} I} \tag{2}$$

$$I \mapsto \min\{255, \max\{0, I\}\} \tag{3}$$

In Equations (1), (2) and (3), I represents the image intensity, D represents the effective region following cropping by the ROI segmentation network 203 (excluding any potential zero-padding to 128×128), and $m_{I_{\mathcal{D}}}$ represents the median signal intensity over $\mathcal{D}$.

The myocardium segmentation neural network 205 may be implemented a modified ResU-Net structure, e.g., as shown and described in detail herein in reference to FIG. 3, similar to the ROI segmentation network 203. The implementation of the myocardium segmentation neural network 205 of the example reduction to practice differed from the ROI segmentation neural network 203 of the example reduction to practice in that it used twice the number of filters at each of the four depth levels due to the higher complexity of the task. The myocardium segmentation neural network 205 may output two masks, one representing the entire myocardium, and the other identifying only the enhanced tissue. In the example reduction to practice, the enhanced regions were minimally cleaned up using an automated series of morphological operations—erosion, opening, and closing—with parameter choices determined by a grid search on the training data only.

C. Anatomical Autoencoder Post-Processing

The third, post-processing, stage 220 includes encoding/decoding block 206, which may include autoencoder neural network 207, as well as anatomy correction and update 208 in latent space 212. Briefly, autoencoder neural network 207 may be a convolutional autoencoder trained to encode (compress) and decode myocardial segmentation masks. Segmentations from the training set may be encoded using the autoencoder neural network 207 to form a latent space 212. The latent space 212 may be modeled as a Gaussian mixture model 222 and conditional re-sampling may be performed to populate the space with anatomically correct samples (e.g., 218). Predicted segmentations may be encoded and the nearest neighbors algorithm may be used to return a perturbed, anatomically correct version 216 of the original 214.

In more detail, autoencoder neural network 207 may ensure that myocardial segmentation results abide by anatomical guidelines, reducing the performance impact of ambiguous regions (e.g., apex and base), where observer ground truth variability was high primarily due to imaging artifacts. Anatomical corrections may be applied on reduced-dimension versions of the myocardial segmentations. The space of low-dimensional myocardial segmentations may be constructed using a convolutional autoencoder network, namely, autoencoder neural network 207, which is shown and described in detail presently in reference to FIG. 4.

Figure 4:
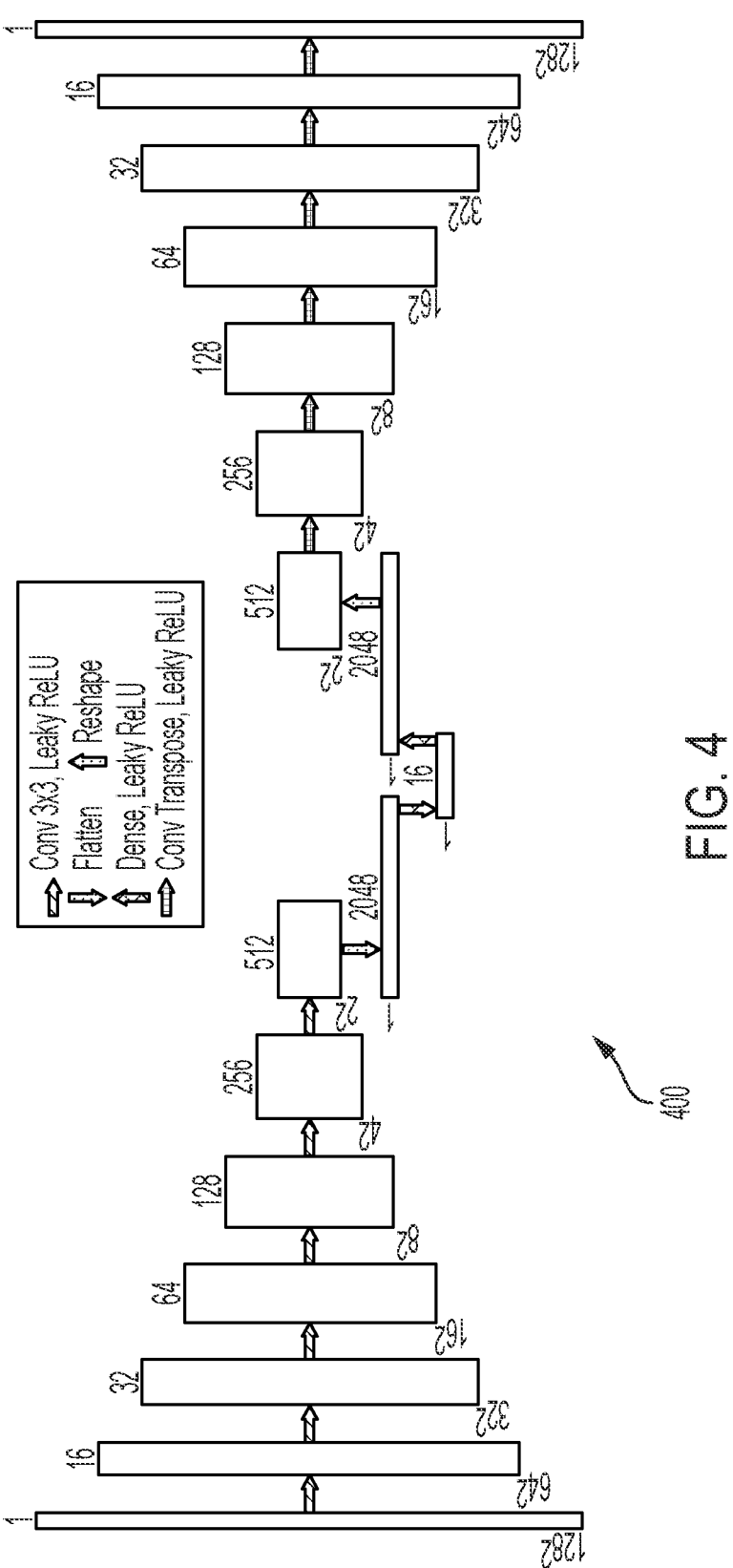
FIG. 4 is a schematic diagram of an autoencoder neural network according to various embodiments.

FIG. 4 is a schematic diagram of an autoencoder neural network 400 according to various embodiments. Autoencoder neural network 400 is suitable for implementing autoencoder neural network 207. For example, autoencoder neural network 400 may be used in a post-processing stage that takes in myocardial masks and uses a series of convolutions and downsampling layers to create a sixteen-dimensional latent representation (left side). The decoderpiece of autoencoder neural network 400 (right side) may re-create the original myocardial segmentation from the latent representation. Autoencoder neural network 400 may be embodied on computer hardware such as is shown and described herein in reference to FIG. 9.

As shown in FIG. 4, autoencoder neural network 400 may include six strided 3×3-kernel convolutional layers, two dense layers, and six transpose convolutions. Leaky ReLU activations may be used after each layer. On the encoding branch, the number of channels may start at sixteen and double after each convolutional layer to 2,048, before being collapsed to the sixteen-dimensional encoding vector by a dense layer.

Returning to FIG. 2, during training, autoencoder neural network 207 may learn how to encode ground truth myocardial segmentations into the sixteen-dimensional latent space 212 and use this representation to decode into the original image, effectively resulting in a collection of sixteen-dimensional vectors representing anatomically correct myocardial segmentations. Next, the latent space 212 may be augmented by generating new vectors based on the existing ones. This may be done by modeling the existing vectors using a Gaussian mixture model 222 and performing rejection sampling, where the rejection criteria encapsulate the anatomical correctness using a collection of morphological checks. Briefly, the ground truth sixteen-dimensional representations of the myocardial segmentations may be modeled as points coming from a mixture of five Gaussian distributions, with weights, means and covariance matrices estimated using the training data. New samples may be drawn from this mixture and kept only if, once decoded, they passed anatomical checks 210. For example, they may be checked for any, or any combination, of convexity defects, holes in myocardium, circularity, number of objects, and/or myocardial wall thickness. This increased the size of the latent space 212 by sampling an additional 10,000 points.

A detailed description of the latent space 212 and its usage follows. Embodiments may utilize a binary function $\delta(\cdot)$, which uses different morphological operations to determine if a myocardium mask is anatomically correct. This function checks for any, or any combination, of convexity defects, holes in myocardium, circularity thresholds, number of objects, and/or myocardial wall thickness. The convolutional autoencoder may be trained to reproduce myocardial segmentations after encoding them to a d-dimensional vector via a map $\phi$ (see FIG. 4), which is approximately invertible: let the decoding function be $\phi^{-1}$. Given the limited data, the low-dimensional vectors of the masks populating the latent space of autoencoder neural network 207 may not be sufficient to capture the diverse geometries of valid segmentations. Therefore, the latent space may be augmented with a large number of d-dimensional vectors, z, such that when decoded by the network, $\delta(\phi^{-1}(z))=1$.

A Gaussian mixture model (e.g., Gaussian mixture model 212) may be fit with k components to the training d-dimensional vectors in the latent space. The example reduction to practice used estimates of k=5 and d=16 using the negative log likelihood (NLL) and adjusted Akaike information criterion by cross-validation on the training set. In order to avoid penalizing high dimensional fits with many small singular values in the covariance matrix, the standard AIC was adjucted by scaling the number of parameters by the effective rank $Tr(\Sigma)/\sigma_{max}(\Sigma)$, where Tr is the trace, $\sigma_{max}$ is the spectral norm, and $\Sigma$ is the covariance matrix of a GMM component (see FIG. 5). When sampling from the new distribution, a vector may be rejected if, once decoded, the resulting mask does not pass the anatomical check $\delta$. Once trained, the autoencoder's latent space may be populated using this re-sampling scheme with vectors which are ensured to decode to anatomically correct masks. When predicting, a new—potentially incorrect—mask, $\hat{I}$, such mask is first encoded (e.g., using encoding/decoding block 206) in the latent space to a vector $\hat{z}=\phi(\hat{I})\in \mathbb{R}^d$. If $\delta(\phi^{-1}(z))\neq1$, that is, $\hat{I}$ does not encode and decode to an anatomically correct image, a nearest-neighbor algorithm may be used to find the closest match $\hat{z}_{NN}$ in the latent space $\hat{z}_{NN}:=\arg\min_{z \ s.t.\delta(\phi^{-1}(z))=1}\|z-\hat{z}\|^2$, where z varies over the constructed couples that satisfy anatomical constraints. Lastly, the final, anatomically correct segmentation may be defined as $\hat{I}'=\phi^{-1}(\hat{z}^*)$, where $\hat{z}^*=\hat{z}+\alpha^*(\hat{z}-\hat{z}_{NN})$, and $\alpha^*$ is the smallest $\alpha$ in [0,1] such that $\delta[\phi^{-1}(\hat{z}+\alpha(\hat{z}-\hat{z}_{NN}))]=1$ (e.g., as determined by anatomy correction and update 208). Details of using the fitting procedure presented in this paragraph for the example reduction to practice are elaborated upon presently in reference to FIG. 5.

Figure 5:
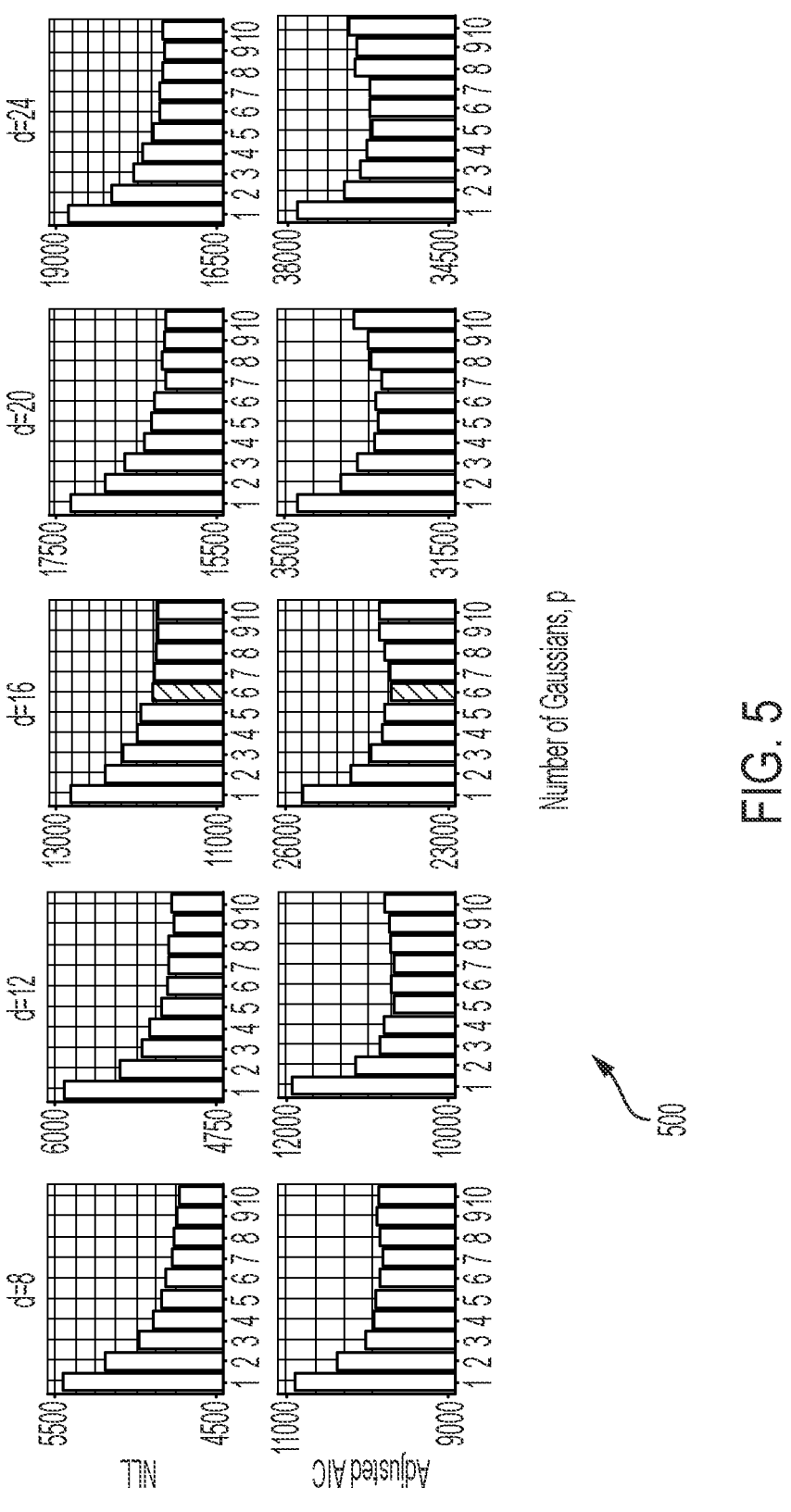
FIG. 5 depicts charts characterizing autoencoder latent space fit according to various embodiments.

FIG. 5 depicts charts 500 characterizing autoencoder latent space fit according to various embodiments. For the example reduction to practice, ten different p-component (x-axis) Gaussian mixture models were fit to the training data encoded by the autoencoder neural network 207. The negative log-likelihood (NLL, top row) and Akaike information criterion scaled by the effective rank (Adjusted AIC, bottom row) were calculated for various latent space dimensions d (columns) using ten-fold cross-validation. The dimension and number of components selected for the final model were d=16 and p=6 (blue) such that NLL plateaus, Adjusted AIC is low, and d is high enough to ensure accurate reconstruction of the images by the autoencoder.

Returning to FIG. 2, as described above, the sixteen-dimension representation of a predicted myocardial segmentation is not guaranteed to decode to an anatomically correct image, but may be corrected by moving in the direction of the nearest neighbor in the latent space by the smallest distance possible, e.g., as determined by $\alpha^*$, such that the decoding becomes anatomically correct, as defined by the criteria described above. This may guarantee anatomical correctness of the predicted myocardium mask.

Finally, the 2-D myocardial segmentations may be reconstructed to volumes and additional automatic volumetric checks may be applied to remove segmentations from images located below the apex or above the base of the LV. Ratios of myocardium to blood pool areas of each slice may be compared to identify the longest sub-sequence of slices in the stack. In the example reduction to practice, the threshold used to determine whether to include a slice in the sub-sequence was approximately a 40% maximum decrease in LV area. Segmented volumes were truncated at the index $i=\max(i_M, \min(i_C+1, i_D))$ where $i_M$ represents the final index in the sub-sequence; $i_C$ represents the index of the first C-shaped slice (a myocardial segmentation shape that occurs at the boundary of the ventricle and the atrium in the basal region); and $i_D$ represents the index of a large deviation (drop to 60% or increase of 60%) in LV area between successive slices. This check may allow for incorporation of at most one C-shaped slice and exclude slices above the base with no true region of interest. The numerical values for the thresholds may be determined by ensuring no more than 5%

To prevent the cine-derived LGE-like images from dominating the training set, they were weighed less in the loss function. The loss function used was an equally weighted combination of the balanced cross-entropy loss and the Tversky loss:

$$l_1(p, \hat{p}) = -(\beta p \log(\hat{p}) + (1 - \beta)\log(1 - \hat{p})) \tag{4}$$

$$l_2(p, \hat{p}) = 1 - \frac{2TP(p, \hat{p})}{2TP(p, \hat{p}) + \beta FP(p, \hat{p}) + (1 - \beta)FN(p, \hat{p})} \tag{5}$$

In Equations (4) and (5), p and $\hat{p}$ represent pixel ground truth and predicted values, respectively, T/F and P/N are true/false positive/negatives, and $\beta$ is weight on the false positives, which was modulated in the example reduction to practice up to $\beta$=0.6 in the first network (left ventricle segmentation neural network 203) to avoid overcropping and down to $\beta$=0.6 in the second network (myocardium segmentation neural network 205) to limit outliers. The final loss combined per-pixel mean loss $l_1$ and per-image loss $l_2$ in equal proportions to incorporate both local and holistic performance. All networks used the Adam optimizer with learning rate of $10^{-3}$ and trained on NVIDIA Titan RTX graphics processing units using Keras and Tensorflow.

The segmentation performance of the example reduction to practice was evaluated using a variety of metrics. Values were computed by averaging slice values over section of the heart (apex, mid-ventricle, base) and over the total heart. Sections of the heart were determined by equipartitioning the short axis distance between the first and last slice. Table 1 below presents these data.

TABLE 1

| Measure | | Location | | | |
| --- | --- | --- | --- | --- | --- |
| | | Apex | Middle | Base | Total |
| LV ROI | BA (%) | 96.3 ± 0.4 | 96.3 ± 0.4 | 96.2 ± 0.5 | 96.3 ± 0.2 |
| | Dice | 0.92 ± 0.02 | 0.95 ± 0.01 | 0.94 ± 0.01 | 0.93 ± 0.01 |
| | HD (mm) | 6.9 ± 1.6 | 6.1 ± 0.8 | 6.6 ± 1.5 | 6.5 ± 0.8 |
| MYO | BA (%) | 93.3 ± 1.1 | 93.1 ± 1.2 | 92.9 ± 1.4 | 93.1 ± 0.7 |
| | Dice | 0.75 ± 0.04 | 0.82 ± 0.02 | 0.80 ± 0.04 | 0.79 ± 0.02 |
| | HD (mm) | 6.4 ± 0.7 | 6.6 ± 0.7 | 7.2 ± 1.5 | 6.7 ± 0.6 |
| Enhancement Region | BA (%) | 69.9 ± 2.3 | 69.8 ± 2.6 | 70.4 ± 2.6 | 70.0 ± 1.4 |
| | Dice | 0.51 ± 0.06 | 0.48 ± 0.07 | 0.59 ± 0.09 | 0.51 ± 0.04 |
| | HD (mm) | 16.8 ± 3.4 | 24.0 ± 6.6 | 19.8 ± 8.7 | 19.9 ± 3.3 |
| Core Scar Region | BA (%) | 74.9 ± 2.8 | 74.3 ± 3.1 | 75.5 ± 3.3 | 74.9 ± 1.8 |
| | Dice | 0.57 ± 0.08 | 0.52 ± 0.09 | 0.63 ± 0.11 | 0.57 ± 0.05 |
| | HD (mm) | 14.9 ± 3.7 | 24.4 ± 6.7 | 18.1 ± 8.9 | 18.9 ± 3.5 | of the ground truth segmented slices would be discarded. Final predicted myocardial segmentations of patient scans may therefore pass both per-slice and per-volume anatomical constraints.

D. Training and Evaluation

In the example reduction to practice, the training data set consisted of 2,484 images from two sources: 1,124 2-D LGE-CMR slices from 75% of available patients and all 1,360 LGE-like images. The test set contained only LGE-CMR images from the remaining 25% of patients (269 2-D images). For the myocardium segmentation network, only LGE-CMR scans with enhancement segmentation ground truth were used (roughly 80% of the train and test sets). The autoencoder used ground truth myocardial segmentations from all the available training data. No early stopping or other methods that learn from the validation set were used in training.

Table 1 depicts balanced accuracy (BA), Dice coefficient (Dice), and Hausdorff distance (HD) for four regions of interest segmented by the example reduction to practice: whole left ventricle (LV ROI), myocardial tissue (MYO), area of enhancement (Enhancement Region), and scar tissue (Core Scar Region). BA is expressed in percentage terms, Dice is a dimensional, and HD is in millimeters. All numbers are averages ±95% confidence interval size over apex/middle/base/total slices of all patients in the test set.

Various quantities derived from the segmentations were also analyzed. In particular, Table 2 below depicts LV ROI (myocardium and blood pool) volume, myocardium volume, enhancement region volume, and core scar region volume derived from the segmentations. Volumes were calculated by summing voxel volumes and using nearest-neighbor interpolation between slices. Mean absolute errors (MAE) were normalized to the respective ground truth volume. To quantify core scar, the enhanced (scar/fibrosis) region segmented by the network was used to extract the dense core scar region using a modified version of the full width at half maximum (FWHM) algorithm. The remote non-enhanced myocardium intensity used by the FWHM algorithm was automatically determined as the median intensity value outside the predicted enhancement region. Differences between ground truth and predictions were reported as the mean absolute error (MAE) normalized relative to the ground truth value.

of 74.9%, Dice of 0.57, and HD of 18.9 mm. The anatomical post-processing (including autoencoder neural network 207) did not have significant impact on performance metrics.

Figure 6:
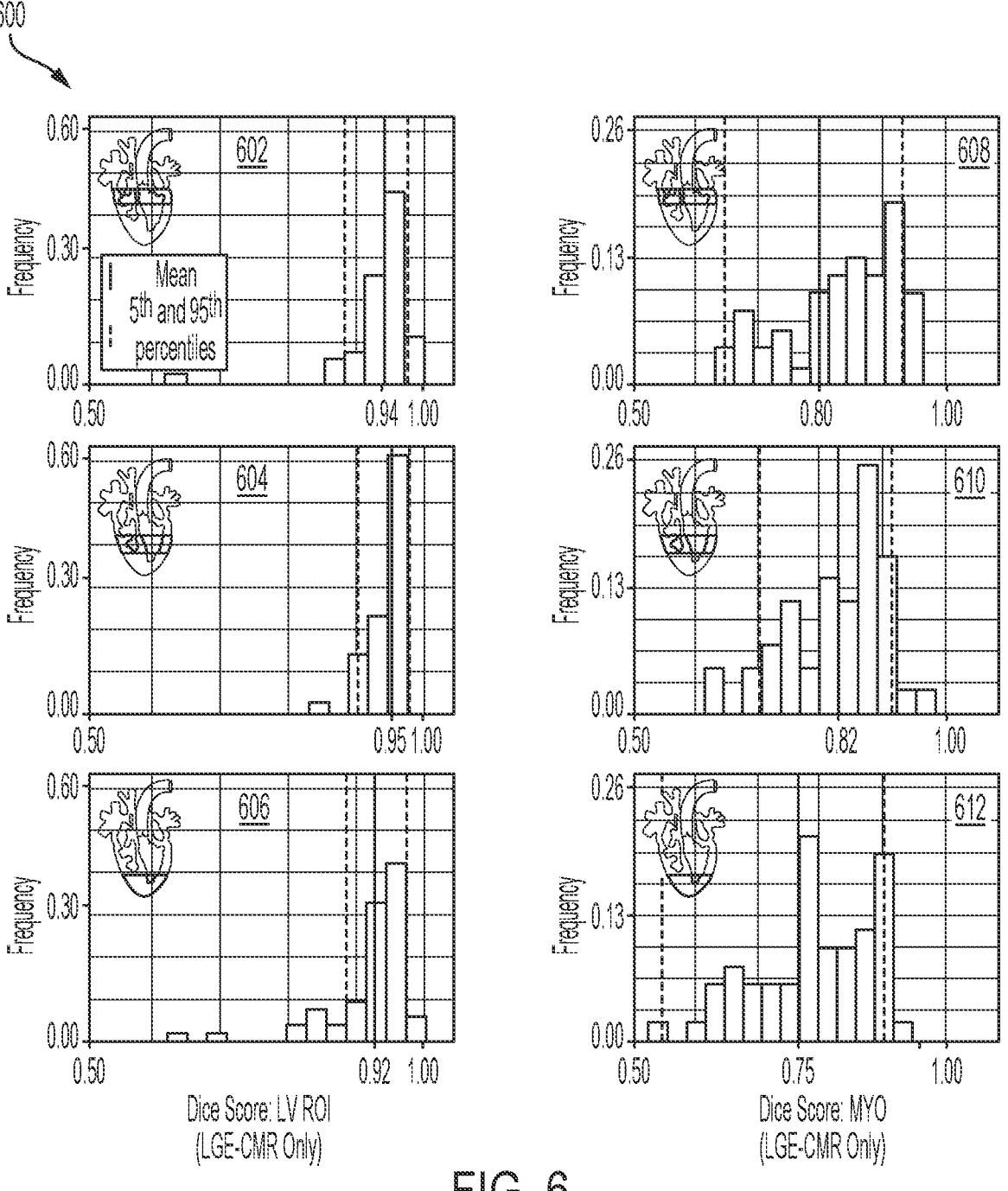
FIG. 6 depicts charts characterizing left ventricle region of interest and segmentation results by region of an example reduction to practice.

FIG. 6 depicts charts 600 characterizing left ventricle region of interest and segmentation results by region of the example reduction to practice. In particular, FIG. 6 illustrates the consistency of results from the example reduction to practice across three regions of the LV (apex, middle, and base) through histograms of per-slice Dice scores. Dice

TABLE 2

| | Feature | LV Volume Tertile | | | |
| | | Lower | Middle | Upper | Total |
|---|---|---|---|---|---|
| LV ROI | | | | | |
| | GT (cc) | 226 (186-259) | 307 (280-327) | 405 (334-573) | 312 (186-573) |
| | Pred (cc) | 237 (193-273) | 312 (279-339)| | 424 (342-614) | 323 (193-614) |
| | Norm. MAE (%) | 10.3 (4.8-18.8) | 4.5 (0.6-8.0) | 4.4 (1.3-10.3) | 6.3 (0.6-18.8) |
| MYO | | | | | |
| | GT (cc) | 121 (85-159) | 171 (110-215) | 180 (114-274) | 158 (85-274) |
| | Pred (cc) | 144 (109-186) | 187 (144-226) | 217 (159-351) | 183 (109-351) |
| | Norm. MAE (%) | 24.1 (12.6-41.1) | 12.7 (1.8-30.8) | 24.7 (22-53.7) | 20.1 (1.8-53.7) |
| Enhancement Region | | | | | |
| | GT (cc) | 27 (15-46) | 24 (3-39) | 30 (7-47) | 27 (3-47) |
| | Pred (cc) | 21 (7-43) | 19 (0-33) | 26 (3-38) | 22 (0-43) |
| | Norm. MAE (%) | 26.6 (5.9-53.4) | 31.1 (3.8-100.0) | 45.4 (15.9-87.5) | 34.2 (3.8-100.0) |
| Core Scar Region | | | | | |
| | GT (cc) | 13 (6-21) | 11 (1-19) | 17 (4-30) | 13 (1-30) |
| | Pred (cc) | 11 (5-20) | 9 (0-17) | 14 (2-22) | 12 (0-22) |
| | Norm. MAE (%) | 14.4 (1.2-41.2) | 42.5 (18.2-100.0) | 42.7 (32.1-72.0) | 33.7 (1.2-100.0) |

Table 2 depicts Ground truth (GT) and predicted (Pred.) volumes and mean absolute error normalized by GT volume (Norm. MAE), together with ranges (parentheses) for four regions of interest segmented by the example reduction to practice: whole left ventricle (LV ROI), myocardial tissue (MYO), area of enhancement (Enhancement Region), and scar tissue (Core Scar Region). GT and Pred. are expressed in cubic centimeters and Norm. MAE in percentage terms. Numbers represent averages across all patients in the test set (Total) and patients grouped by GT LV volume tertile (Lower/Middle/Upper).

F. Statistical Methods

All results presented without a qualifier represent averages over slices or patients from the 25% of the contrast-enhanced data reserved for testing using a random split. Prediction error was estimated using approximately normal confidence intervals for large n (e.g., number of slices) and minimum/maximum ranges for small n (e.g., number volumes). Statistically significant difference testing was assessed using Welch's t-test using the Python package scipy.

III. Analysis of the Example Reduction to Practice

A. Segmentation Performance

Segmentations from the example reduction to practice were evaluated using BA, Dice, and HD computed on the test set as set forth in Section II. Table 1 shows that LV ROI identification (RIO segmentation neural network 203) resulted in BA of 96%, Dice coefficient of 0.93 and HD of 6.5 millimeters (mm). The myocardium segmentation neural network 205 resulted in 93%, 0.79, and 6.7 mm for the LV myocardium (MYO) using the same metrics. The same sub-network evaluated for the identification of the enhancement region led to 70% BA, 0.51 Dice, and 19.9 mm HD. The core scar portion of the enhanced region achieved BA scores are shown for the LV ROI (602, 604, 606) and LV myocardial segmentations (608, 610, 612). The average Dice scores for each region are 0.94 (602) and 0.80 (608) for basal slices, 0.95 (604) and 0.82 (610)} for middle slices, and 0.92 (606) and 0.75 (612) for apical slices. The averages are shown as solid vertical lines, and the dotted lines represent the 5th and 95th percentiles. Further details of LV ROI and myocardial segmentations for the three regions of the ventricle are presented in Table 1.

Table 3 presents a comparison of Dice scores and HD for previously published LV myocardial segmentation methods, showing that the example reduction to practice achieved the lowest HD among those LGE-CMR myocardium segmentation methods. The Dice score is similar to the other techniques' results. The example reduction to practice improved upon both the inter-observer Dice score of 0.76 as well as the inter-observer HD (10.6±4.65 mm endocardial HD and 12.5±5.38 mm epicardial HD) achieved in the 2019 CMRSeg MICCAI challenge.

TABLE 3

| Method | MYO Dice Score | MYO Hausdorff Distance (mm) |
|---|---|---|
| Example Reduction to Practice | 0.79 ± 0.02 | 6.70 ± 0.53 |
| Interobserver | 0.76 ± 0.08 | 12.50 ± 5.38 |
| Zabihollahy et al. | 0.85 ± 0.03 | 19.21 ± 4.74 |
| Yue et al. | 0.76 ± 0.23 | 11.04 ± 5.82 |
| Roth et al. | 0.78 | 16.30 |
| Mean Result of MS-CMRSeg MICCAI Challenge | 0.77 ± 0.10 | 18.06 ± 12.18 |
| Chen, et al. | 0.83 ± 0.04 | 12.45 ± 3.14 |

In Table 3, all entries were rounded from the provided values to the nearest tenths place. Note: These sources use different datasets; Data for Interobserver (Zhuang, X., Multivariate mixture model for cardiac segmentation from multi-sequence MRI, Int. Conf. on Med. Image Comput. Comput. Interv. 581-588 (2016) and Zhuang, X., *Multivariate mixture model for myocardial segmentation combining multi-source images*, IEEE Transactions on Pattern Analysis Mach. Intell. (T PAMI) 41, 2933-2946 (2019)), Yue et al., Roth et al., and Chen, et al. (the latter three references are presented in the Background section) are based on the 2019 CMRSeg MICCAI challenge consisting of 2-D LGE-CMR and corresponding steady-state free precision (bSSFP) from 45 patients, various subsets of whom were used as test sets. Zabihollahy et al. (presented in the Background section) used three orthogonal views of 34 subjects with 3-D LGE-CMR scans.

Figure 7:
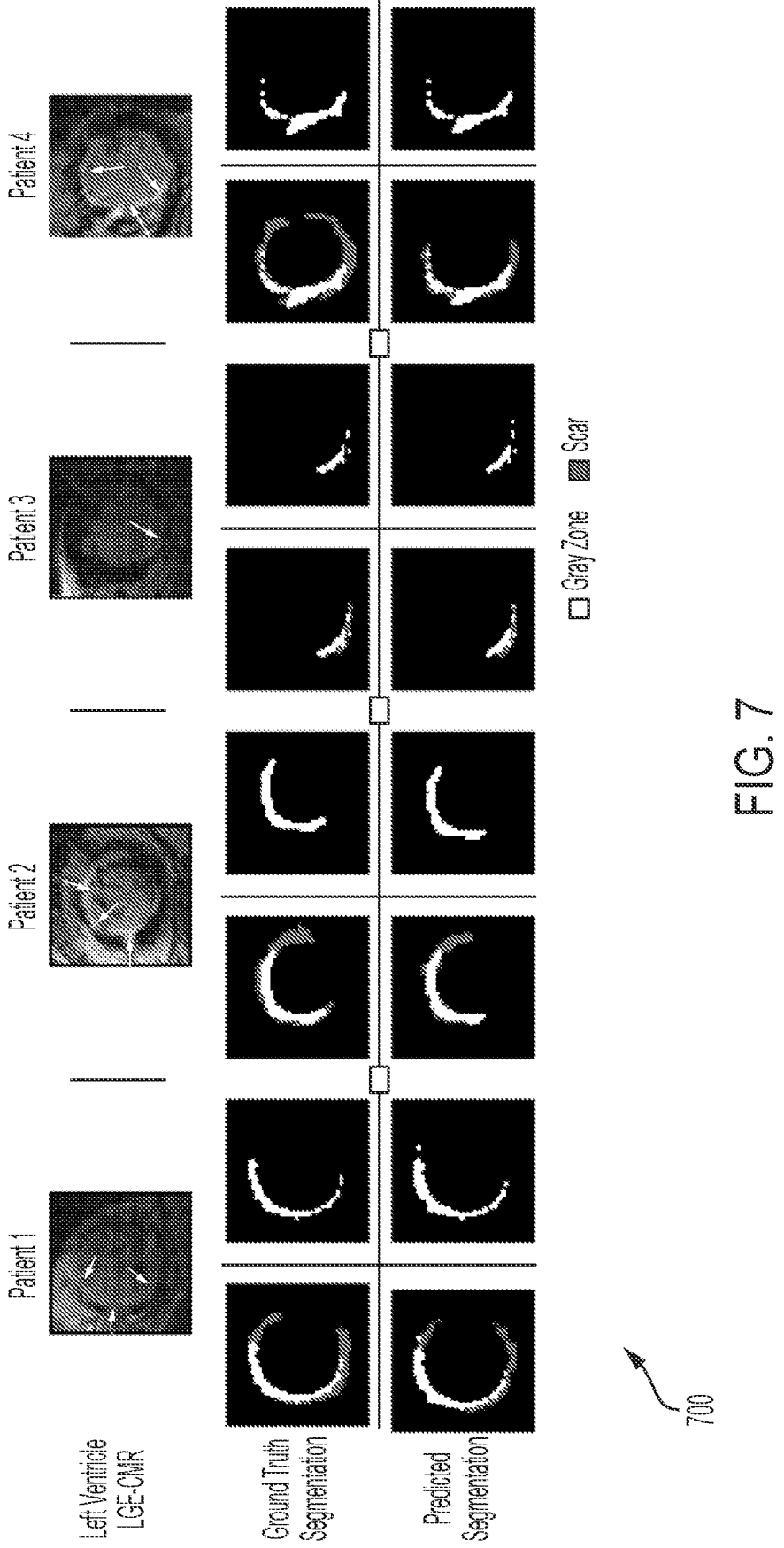
FIG. 7 shows scar segmentation results produced by the example reduction to practice.

FIG. 7 shows scar segmentation results 700 produced by the example reduction to practice. The first row shows the original scan, the middle row presents the ground truth scar and grey zone segmentations, and the bottom row shows the predicted segmentations. Results for Patients 1-3 are representative examples of scar and grey zone segmentations. Patient 4 was included to show an example of an outlier for which grey zone segmentation has low accuracy. Of note, the low grey zone accuracy did not hinder the scar segmentation performance. Balanced accuracy, Dice score, and HD for all enhancement and core scar for the apex, middle, and base of the LV are shown in Table 1.

B. Clinical Feature Calculation

The example reduction to practice was used to seamlessly calculate clinical features, such as scar burden and LV volume. The results demonstrate no statistically significant difference between features computed using automatic versus manual (expert-level) segmentations (P-value=0.71 for LV volume and P-value=0.46 for scar volume).

Figure 8:
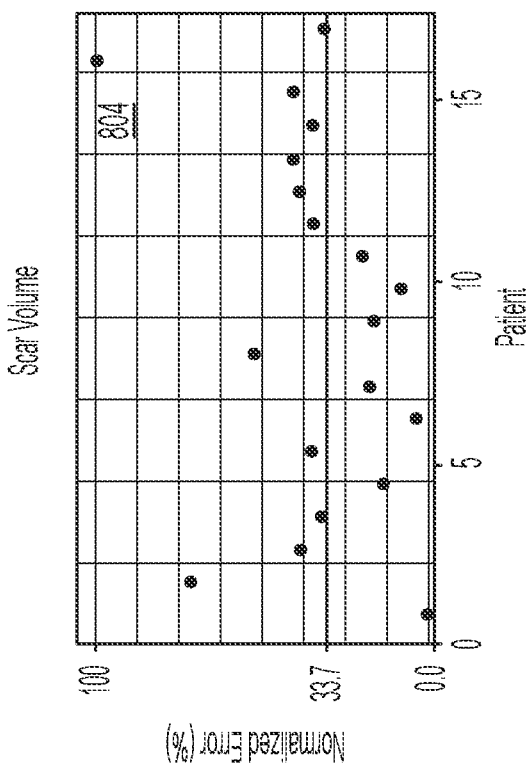
FIG. 8 depicts charts characterizing scar and left ventricle volume errors of the example reduction to practice.
Figure 8:
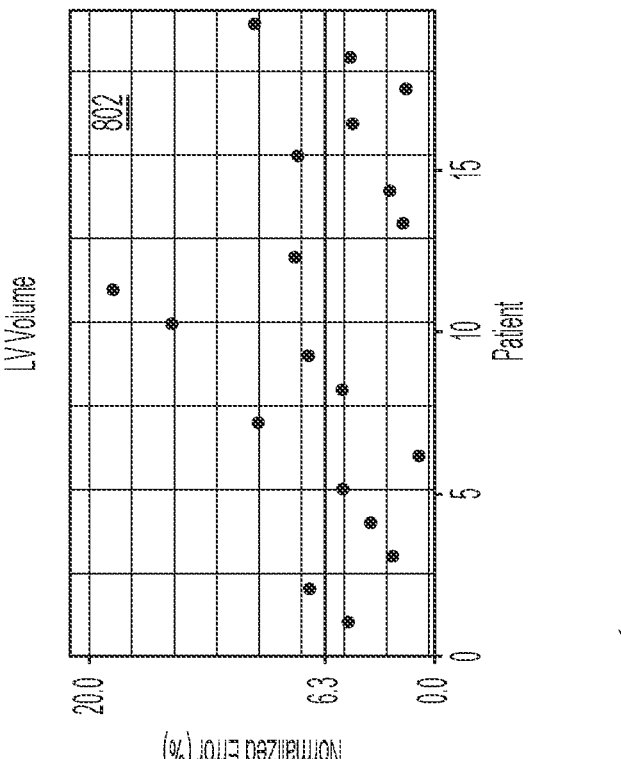

FIG. 8 depicts charts 800 characterizing scar and left ventricle volume errors of the example reduction to practice. Chart 804 shows the normalized absolute error of each LV volume in the test set (dots), together with the MAE at 6.3% (line). That is, each dot represents the error in LV volume of a single segmented patient scan. Similarly, chart 804 shows scar volume comparison to ground truth, which resulted in an MAE of 33.7%. Also shown are each patient's scar volume absolute errors (dots). Table 2 presents ground truth and predicted volumes of the entire LV, LV myocardium, enhancement region, and core scar volumes in cubic centimeters (cc), as well as MAE in patients grouped by volume of the LV. Scar burden, calculated as the mean scar-to-myocardium volume fraction, differed by 2% when comparing automatic and manual segmentations.

Figure 9:
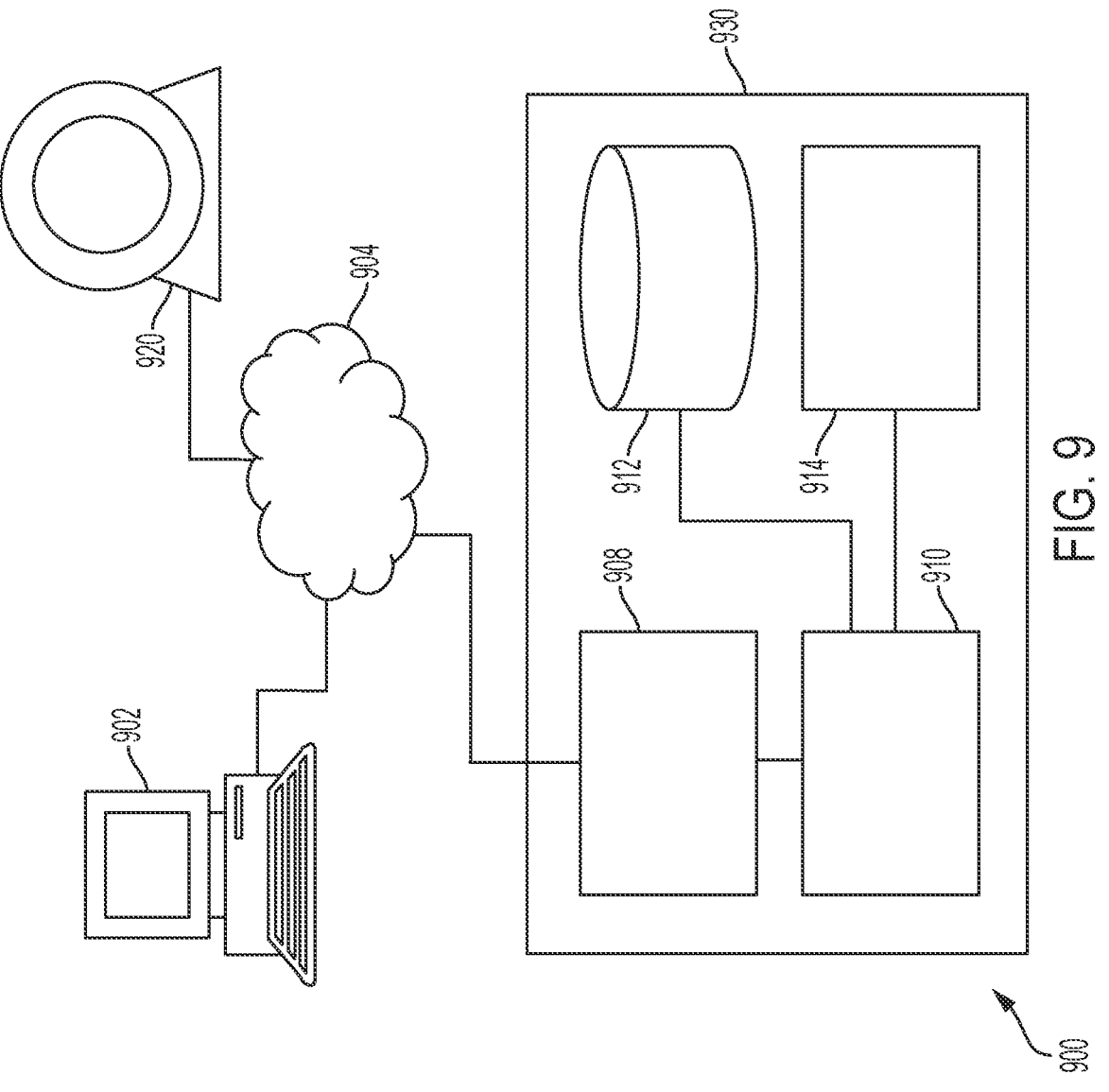
FIG. 9 is a schematic diagram of a system suitable for implementing various embodiments.

FIG. 9 is a schematic diagram of a system 900 suitable for implementing various embodiments. System 900 includes scanner 920, training data source 902, and computer 930. Scanner 920 may be an MRI scanner, a CT scanner, an ultrasound scanner, or any other scanner type amenable to use with an embodiment. Any of scanner 920, training data storage 902, and computer 930 may be communicatively coupled via network 904, such as the Internet or other public or private networks, or via direct connection. Scanner 920 may provide training data to training data storage 902. Training data storage 902 may include persistent storage of LGE-CMR and/or LGE-like images.

Computer 930 can be a laptop, desktop, or tablet computer, can be incorporated in one or more servers, clusters, or other computers or hardware resources, or can be implemented using cloud-based resources. Computer 930 includes volatile memory 914 and persistent memory 912, the latter of which can store computer-readable instructions, that, when executed by electronic processor 910, configure computer 930 to at least partially perform any of the computer-implemented methods shown and described herein. Computer 930 is communicatively coupled to network 904 via network interface 908. Other configurations of system 900, associated network connections, and other hardware, software, and service resources are possible.

IV. Advantages and Additional Features

In sum, this disclosure presents a deep learning approach for automatic and anatomically accurate segmentation of myocardium and scar/fibrosis on LGE-CMR images and for extraction of anatomical features, such as scar burden and ventricular volume. The complex learning process may involve three sub-networks, each having distinct tasks: the first reduces class imbalance between the ROI and background, the second delineates the endocardium and epicardium, and the third ensures anatomical correctness for both slices and volumes. In particular, the third sub-network may encompass a number of per-slice and per-volume morphological checks. The distribution-based model of the latent space may allow for complex anatomical segmentations such as C-shaped myocardium that can occur in the ventricle's base. Moreover, embodiments may use volumetric checks that standardize and automate the identification of apical and basal (beginning and end) slices, a time-consuming and often error-prone process when performed manually. Importantly, these checks may also establish consistency and reliability in the calculation of clinical features e.g., LV volume and scar burden).

Embodiments may fully automate the segmentation of LV LGE-CMR images. The high number of manual steps and the inter-observer variability associated with this task have hindered implementing LGE-CMR image analysis as part of routine patient assessment and prognostication. For instance, scar burden and LV volume computed from myocardial and scar/fibrosis segmentations have been associated with risk of sudden cardiac death, but are seldom used in practice to guide primary prevention. Embodiments can produce accurate segmentations within seconds from raw medical images, making it possible to more easily incorporate LGE-CMR image analysis in clinical decision-making.

Embodiments can achieve good performance despite the complexity of LGE-CMR images. Contouring of LGE-CMR images is complicated by the presence of both low (viable) and high (scar/fibrosis) signal intensity myocardium regions. As a result, manual segmentations can be variable even across experts, potentially affecting estimated features of clinical interest. The same complications also affect computer-aided segmentation algorithms, which can struggle with visually similar, but distinct anatomical entities (e.g., myocardium and blood pool). The results of the example reduction to practice demonstrate robust learning, leading to reliable segmentations, despite inherent noise present in ground truth data. The example reduction to practice outperformed inter-expert (i.e., manual) scores and performs well on inputs with various scar distribution patterns acquired from numerous imaging centers and MR machines. The network maintained consistently high performance across all regions of the heart. This is prioritized by design in favor of higher average Dice scores with poor-performing outlier slices. Despite the example reduction to practice's success with whole-ventricle segmentation, some outliers were present when segmenting the area of enhancement (see FIG. 7, Patient 4). However, the ability of embodiments to tease out the core scar does not seem sensitive to the overestimation of grey zone, leading to accurate clinical feature estimation.

The example reduction to practice took advantage of the more widely available cine data with ground truth segmentation labels and addresses the scarcity of available segmented LGE-CMR data. Importantly, the example reduction to practice performed well despite data scarcity due to the innovative style transfer process to augment the training data presented herein. This process generates pseudo-enhancement for non-enhanced cine using a low-cost cine-to-LGE conversion algorithm. This technique tripled the available training data and added heterogeneity to the learning process in terms of patient cohorts, MR scanners (Siemens, Philips, and General Electric), and health centers.

By training an embodiment with both LGE and LGE-like cine CMR images from a broad range of cohorts, embodiments may fully automate segmentation of short-axis cardiac images across multiple medical imaging modalities. For example, since style-transferred cine images may already be part of training, some embodiments would be expected to segment cine scans with high accuracy. Similarly, given that signal intensity pre-processing was minimal, it is expected that this approach generalizes well to computed tomography images, which, like CMR, display a high-intensity blood pool and low-intensity myocardium. Finally, embodiments may easily be applied to non-ICM patient scans as well.

Various embodiments are expected to be an important and necessary first step in a number of fields related to cardiac imaging. For example, in machine learning or radiomics applied to CMR, having an efficient way to discard information outside the region of interest can greatly enhance models' abilities to learn without getting bogged down with extraneous information. Furthermore, personalized computational heart modeling simulating cardiac electrophysiology to identify arrhythmogenic pathways and arrhythmia dynamics or the targets for ablation therapy often require segmentations to capture heart geometry and scar distribution. Their efficiency and robustness could therefore be drastically improved by embodiments as disclosed herein.

The techniques disclosed herein are not limited to processing contrast-enhanced cardiac MRI data. Rather, the disclosed techniques may be used more generally to segment three-dimensional cardiac data produced by any technique, e.g., computer tomography (CT). For example, some embodiments provide a fully automated computer-implemented deep learning method of cardiac image (e.g., MRI cardiac data, CT cardiac data, or more generally, three-dimensional cardiac data) segmentation. The method includes providing three-dimensional cardiac data (e.g., cardiac MRI data, cardiac CT data) to a first computer-implemented deep learning network trained to identify a left ventricle region of interest, such that left ventricle region-of-interest-identified cardiac data is produced. The method also includes providing the left ventricle region-of-interest-identified cardiac data to a second computer-implemented deep learning network trained to identify myocardium, such that myocardium-identified cardiac data (e.g., myocardium-identified MRI cardiac data, myocardium-identified CT cardiac data) is produced. The method further includes providing the myocardium-identified cardiac data to at least one third computer-implemented deep learning network trained to conform data to geometrical anatomical constraints, such that anatomical-conforming myocardium-identified cardiac data (e.g., anatomical-conforming myocardium-identified cardiac MRI data, anatomical-conforming myocardium-identified cardiac CT data) is produced. The method further includes outputting the anatomical-conforming myocardium-identified cardiac data.

The techniques disclosed herein are not limited to cardiac imaging. Rather, the disclosed techniques may be used more generally for machine vision. For example, the disclosed techniques for obtaining anatomical-conforming MRI data may be used generally in any problem that demand specific guidelines from predicted outputs. In training a deep learning model that incorporates constraints, embodiments may generate a latent vector space. The latent vector space may be enhanced with encoded vectors derived using a Gaussian mixture model, but only if decoded versions of the encoded vectors pass given constraints. Such techniques are described in detail herein, e.g., in reference to the third neural sub-network.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A fully automated computer-implemented deep learning method of contrast-enhanced cardiac MRI segmentation, the method comprising:

providing cardiac MRI data to a first computer-implemented deep learning network trained to identify a left ventricle region of interest, whereby left ventricle region-of-interest-identified cardiac MRI data is produced, wherein the first computer-implemented deep learning network comprises a convolutional neural network with residuals;

providing the left ventricle region-of-interest-identified cardiac MRI data to a second computer-implemented deep learning network trained to identify myocardium, whereby myocardium-identified cardiac MRI data is produced, wherein the second computer-implemented deep learning network comprises a convolutional neural network with residuals;

providing the myocardium-identified cardiac MRI data to at least one third computer-implemented deep learning network trained to conform data to geometrical anatomical constraints to ensure anatomical accuracy, whereby anatomical-conforming myocardium-identified cardiac MRI data is produced, wherein the at least one third computer-implemented deep learning network comprises a convolutional autoencoder coupled to a Gaussian mixture model, wherein the at least one third computer-implemented deep learning network is trained to conform data to geometrical anatomical constraints by: autoencoding the myocardium-identified cardiac MRI data to generate a latent vector space; and statistically modeling the latent vector space; wherein the latent vector space is populated with anatomically-correct samples and allows for nearest-neighbor identification of the anatomical-conforming myocardium-identified cardiac MRI data, whereby the anatomical-conforming myocardium-identified cardiac MRI data is anatomically correct; and outputting the anatomical-conforming myocardium-identified cardiac MRI data, wherein no manual human intervention is required.

2. The method of claim 1, wherein the anatomical-conforming myocardium-identified cardiac MRI data comprises scar segmentation data.

3. The method of claim 1, further comprising reducing a background based on the ventricle region-of-interest-identified cardiac MRI data.

4. The method of claim 1, wherein the second computer-implemented deep learning network is trained to identify myocardium by delineating endocardium and epicardium.

5. The method of claim 1, wherein the outputting comprises displaying on a computer monitor.

6. A fully automated computer system for deep learning contrast-enhanced cardiac MRI segmentation, the computer system comprising:

a first computer-implemented deep learning network trained to identify a left ventricle region of interest in cardiac MRI data to produce left ventricle region-of-interest-identified cardiac MRI data, wherein the first computer-implemented deep learning network comprises a convolutional neural network with residuals;

a second computer-implemented deep learning network trained to identify myocardium in the left ventricle region-of-interest-identified cardiac MRI data to produce myocardium-identified cardiac MRI data, wherein the second computer-implemented deep learning network comprises a convolutional neural network with residuals;

at least one third computer-implemented deep learning network trained to conform the myocardium-identified cardiac MRI data to geometrical anatomical constraints to produce anatomical-conforming myocardium-identified cardiac MRI data to ensures anatomical accuracy, wherein the at least one third computer-implemented deep learning network comprises a convolutional auto-encoder coupled to a Gaussian mixture model, wherein the at least one third computer-implemented deep learning network is trained to conform data to geometrical anatomical constraints by: autoencoding the myocardium-identified cardiac MRI data to generate a latent vector space; and statistically modeling the latent vector space; wherein the latent vector space is populated with anatomically-correct samples and allows for nearest-neighbor identification of the anatomical-conforming myocardium-identified cardiac MRI data, whereby the anatomical-conforming myocardium-identified cardiac MRI data is anatomically correct; and an output configured to provide the anatomical-conforming myocardium-identified cardiac MRI data, wherein no manual human intervention is required.

7. The system of claim 6, wherein the anatomical-conforming myocardium-identified cardiac MRI data comprises scar segmentation data.

8. The system of claim 6, wherein the computer system is configured to reduce a background based on the ventricle region-of-interest-identified cardiac MRI data.

9. The system of claim 6, wherein the second computer-implemented deep learning network is trained to identify myocardium in the cardiac MRI data by delineating endocardium and epicardium.

10. The system of claim 6, wherein the output comprises a computer monitor configured to display the anatomical-conforming myocardium-identified cardiac MRI data.

* * * * *